March 19, 1935.   M. J. REID   1,994,591
RECOVERY OF PLASTICIZERS FROM FILM SCRAP AND LIKE MATERIALS
Filed May 21, 1932   2 Sheets-Sheet 1
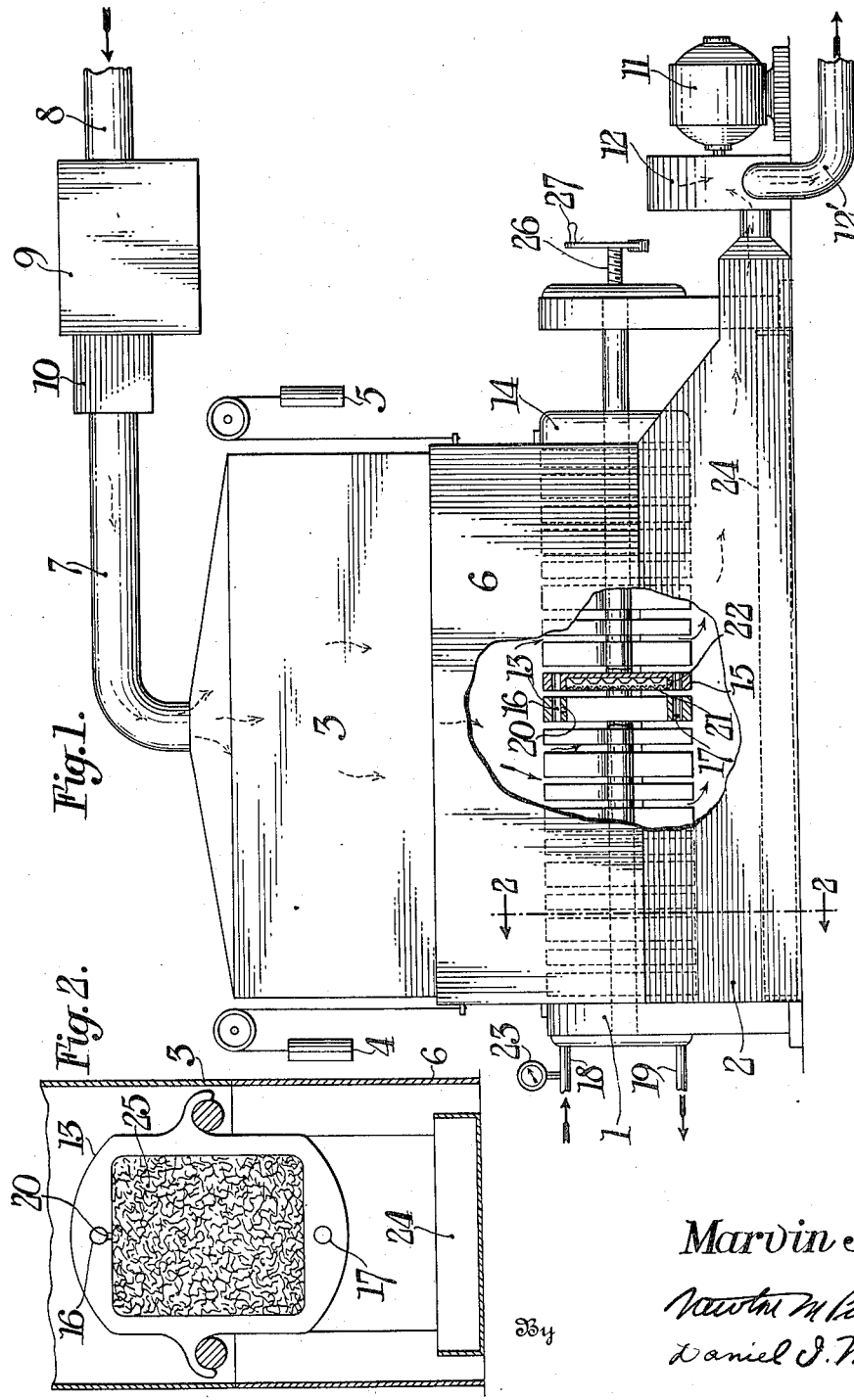
Inventor:
Marvin J. Reid,

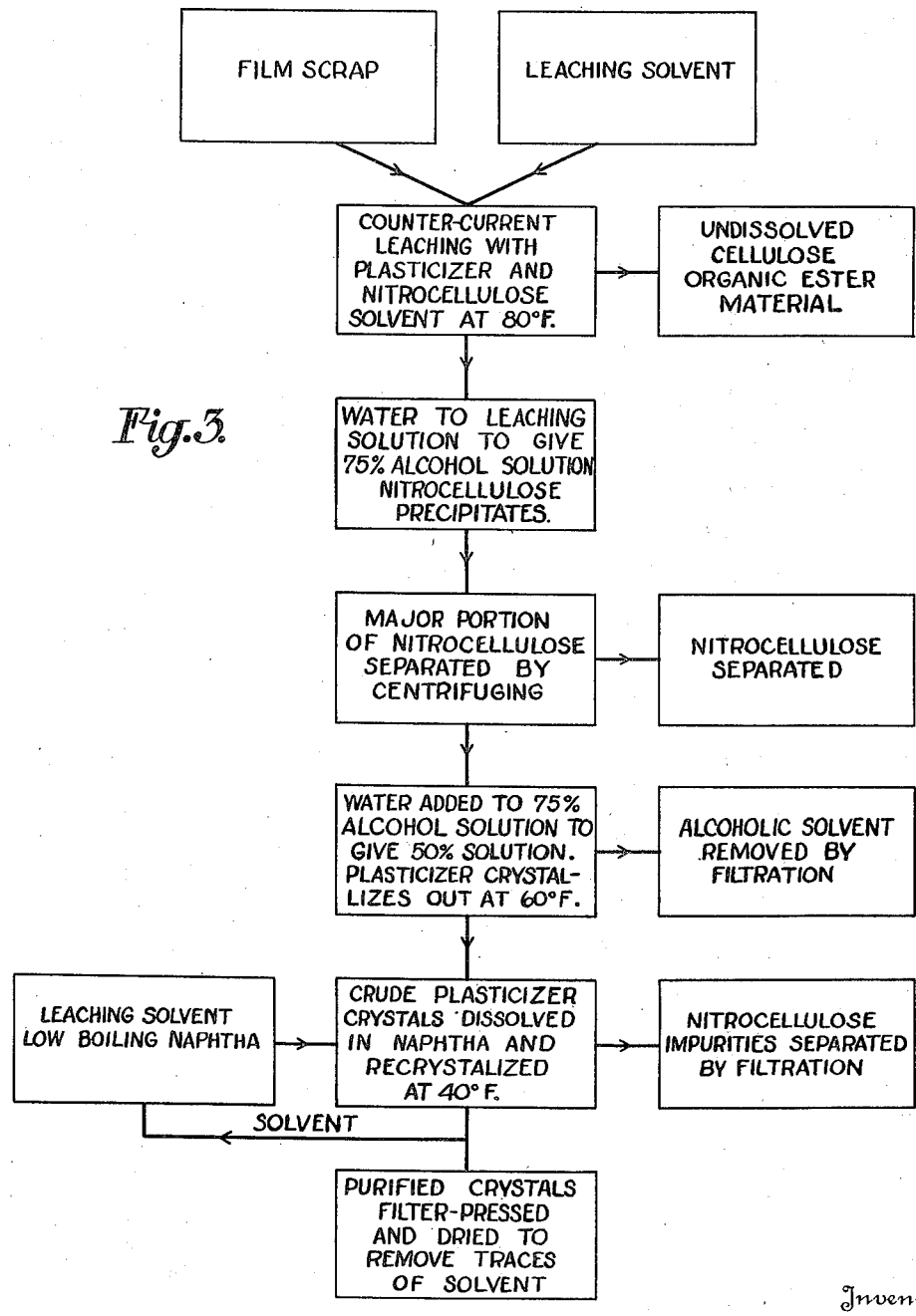

Patented Mar. 19, 1935

1,994,591

UNITED STATES PATENT OFFICE 1,994,591

RECOVERY OF PLASTICIZERS FROM FILM SCRAP AND LIKE MATERIALS

Marvin Jerome Reid, Rochester, N. Y., assignor to Eastman Kodak Company, Rochester, N. Y., a corporation of New York Application May 21, 1932, Serial No. 612,850

15 Claims. (Cl. 260—99.20)

This invention relates to the recovery of plasticizers from photographic film scrap and like plastic materials and more particularly to a process which is applicable to the recovery of triphenyl phosphate from cinematographic film comprising a cellulose acetate support having superimposed thereon an overcoating of cellulose nitrate.

The recovery and re-use of the ingredients originally entering into the manufacture of photographic film, especially cinematographic film and other cellulose ester plastic materials, in recent years has constantly assumed greater importance and processes have been developed for treating scrap, such as worn moving picture film, punchings obtained in perforating operations and miscellaneous portions of material produced in various stages of the manufacture and use of film. These processes have been designed primarily to recover such ingredients as silver, gelatin, and cellulosic material. In the case of certain types of nitro-cellulose film, they have been applied to the recovery of camphor, which is ordinarily one of its essential ingredients. So far as I am aware, it has never been considered feasible to recover the plasticizers commonly used in the manufacture of so-called "safety" or cellulose acetate film because of the fact that it has been impossible to obtain them free from undesirable amounts of nitrocellulose and other laminations which are desirably present in building up a completed photographic film. Furthermore it has never been considered possible to recover plasticizers from scrap cellulose ester plastic materials such as are produced in molding processes and analogous manufacturing operations in the manner hereinafter described.

The present invention is designed to provide a practical and economic method for accomplishing these results. It has for its principal object to provide a method of recovering plasticizers or softeners from cellulose ester plastic materials in a pure form suitable for re-use in film manufacture, molding process and the like. A further specific object is to recover pure triphenyl phosphate from a cellulose acetate film overcoated with cellulose nitrate. Other objects will hereinafter appear.

My invention is based primarily upon what may be called fractional separation as applied to a solution containing two or more ingredients. In removing the plasticizer or softener from cellulose acetate photographic film coated with cellulose nitrate, for example, I apply a leaching solvent which dissolves both the cellulose nitrate away from the cellulose acetate base and dissolves the plasticizer from the film at the same time. Although it is a fairly simple matter to leach out the plasticizer in this manner, heretofore it has been impossible to separate the dissolved cellulose nitrate from the plasticizer and obtain the latter in sufficiently pure form for re-use in film manufacture. After extensive experimentation I have discovered a process whereby this may be accomplished. One of the preferred embodiments of my process is described below, it being understood that the examples and accompanying descriptive material are included merely for purposes of illustration of the principles of by invention and not as a limitation thereof.

My process comprises two stages. The first stage includes a leaching step followed by fractional separating operations in which the major portion of the nitrocellulose is removed; a crude form of the plasticizer, triphenyl phosphate, for example, contaminated by an undesirable amount of nitrocellulose is thereby obtained. The second stage includes further leaching and separating operations whereby the plasticizer is obtained substantially 100% pure, free from all contamination with nitrocellulose or other impurities.

The film scrap material which is subjected to my process may be derived from any one of a number of sources. If the material is unused film which still has its emulsion coating thereon or consists of used film, it is first subjected to a preliminary treatment with hot water which removes the gelatin together with the sensitive silver halides and other materials entering into the emulsion. It is desirable in some cases to bleach such material with hypochlorite solution which removes any dye and gelatin which may still adhere thereto after the hot water treatment. For the purposes of describing my invention, it is assumed in the example immediately following that the scrap consists of a cellulose acetate support from which the dyestuffs and emulsion have been removed by a prior washing or bleaching operation, but still having combined therewith a sub-coating of nitrocellulose and substantially all of its original plasticizer content.

The material is first subjected to counter-current leaching with a solvent which dissolves both the plasticizer and the nitrocellulose subcoating, but leaves the cellulosic material of the base support substantially unaffected. It is desirable that such a solvent or solvent combination have a softening action on the support, but this action should stop short of actual solution. A typical solvent may consist of a mixture of acetone and methyl alcohol in proportions of from about 5 to 30% acetone and 95 to 70% methyl alcohol. The leaching is preferably carried out at a temperature of about 80° F. with agitation. After mechanically separating the cellulose acetate support material from the alcoholic solution, the latter contains in solution all of the plasticizer together with the nitrocellulose subcoating. Sufficient water is then added to the solution to precipitate only the nitrocellulose. The solution may be heated to about 100° F. to facilitate coagulation or agglomeration after which the nitrocellulose precipitate is filtered off. More water is then added to the filtrate, this being in sufficient amount to bring down a crude precipitate of triphenyl phosphate containing whatever nitrocellulose was not previously removed. It may be stated here that the precipitation of the nitrocellulose is not sharply defined. Consequently, since the most important thing is to recover the plasticizer, one originally adds only enough water to precipitate the majority of the nitrocellulose without precipitating appreciable quantities of the plasticizer. This leaves some nitrocellulose in solution which is unavoidably precipitated with the plasticizer giving what I term a crude plasticizer precipitate. This crude precipitate is filtered off and subjected to the following treatment:

The crude cake is leached with a low-boiling naphtha known as "Textile spirits" (boiling range of approximately 70-105° C.) at a temperature of about 80-100° F. This brings all of the triphenyl phosphate into solution leaving behind all of the nitrocellulose which is wholly insoluble in the naphtha. Whatever nitrocellulose impurities are present in the crude plasticizer are removed by mechanical separation and the naphtha solution cooled down to about 40° F., at which time triphenyl phosphate crystallizes from the super-saturated solution. This triphenyl phosphate, after complete removal of solvent, is substantially 100% pure and may be re-used in the manufacture of photographic film and other plastic products. The naphtha containing some triphenyl phosphate is reintroduced into the process for treating a new batch of crude plasticizer.

In the accompanying drawings in which like reference numerals refer to like parts.

Fig. 1 is an elevational view, partly in section illustrating a preferred form of apparatus for filtering and drying a solid plasticizer in accordance with the invention.

Fig. 2 is a fragmentary sectional view taken on the line 2—2 of Fig. 1.

Fig. 3 is a flow sheet showing the principal steps in the recovery of a typical solid plasticizer according to one of the methods herein described.

The following example will illustrate a typical manufacturing operation:

EXAMPLE 1. RECOVERY OF TRIPHENYL PHOSPHATE

*Preparation of the crude*

500 pounds of wet film scrap material consisting of bits of cellulose acetate support overcoated with cellulose nitrate plasticized with triphenyl phosphate and comprising 350 pounds, dry weight, of film scrap and 150 pounds of water is leached with 800 gallons of methyl alcohol at a temperature of 80° F. The leaching operation is carried out as a counter-current process, three leachings ordinarily being employed. The scrap material, after the alcohol has been permitted to pass therethrough, is washed with three changes of cold water to recover the alcohol which it may contain.

The alcoholic solution obtained by the leaching operation is pumped into a tank and enough water is added to make up a 75% alcohol solution. The addition of water precipitates the major portion of the dissolved nitrocellulose, the solution being heated to about 100° F. to facilitate agglomeration and separation of the nitrocellulose. After standing for 30 minutes, the solution is centrifuged to remove the precipitated nitrocellulose and the solvent liquid containing the plasticizer and some nitrocellulose in solution is run into a second tank and water added to make up a 50% solution. This is cooled to 60° F. or lower and allowed to stand approximately 8 hours. The dissolved triphenyl phosphate crystallizes out together with any nitrocellulose present and is separated by running the solution through a filter box. This solid material is the crude referred to heretofore.

*Refining the crude*

The crude triphenyl phosphate is placed in a proper receptacle and dissolved in Textile spirits at a temperature of 80° F., the concentration of the solution being about $\tfrac{8}{10}$ pound of crude in one gallon of solvent. After standing for 20 minutes, the solution is decanted through a filter, the nitrocellulose remaining behind in the receptacle. The clear solution is then conveyed to a crystallizer and cooled to 40° F. At this temperature about $\tfrac{7}{10}$ pound of crystals per gallon of liquid are obtained.

These crystals are run into a filter press, filtered in the usual manner and cold air is then passed over them for several hours, after which they are subjected to a current of warm air for several hours more. The filtrate containing whatever triphenyl phosphate is soluble in the naphtha at 40° F. is saved and used as the leaching solvent for a new batch of crude.

In Fig. 1 of the drawings I have illustrated a preferred means and method of removing the last traces of the hydrocarbon solvent from the filter cake. The apparatus, which may be described as a "drying type" filter press, consists essentially of a filter press of the plate and open frame type, having a supporting frame of sufficient length to permit at least 2 inches free space between each plate and frame when the press is opened and the plates and frames separated. The lower part of the press 1 is enclosed by the sheet metal casing 2 which consists of four or more removable panels which fit snugly about the press in such a manner as to be substantially air-tight when the press is in open position. Cooperating with and fitting over the upper portion of the press is a hood 3 also constructed of sheet metal and equipped with counter weights 4 and 5 which function to maintain the lower or telescoping portion 6 in a given position. The hood is provided with an air conduit 7 through which fresh air is led after passing through the inlet 8, the air conditioning equipment 9 and the heaters 10. The blower 12 operated by motor 11 and provided with outlet 12' serves to create a suction or draft through the hood when the telescoping portion 6 is in lowered position, the air moving downwardly past the separated plates and frames in the direction indicated by the arrows and serving to effectively remove all solvent vapors from the filter cake held within the frames.

The operation of the device is as follows: At the beginning of the filter pressing operation, the panels 2 are removed and the telescoping portion 6 of the hood 3 is raised. The press is closed by moving the head 14 to the left by means of shaft 26 operated by hand crank 27 or equivalent means thereby forcing the respective frames 13 and the plates 15 into contact and aligning the inlet openings 16 and the outlet openings 17. The press is closed and cooled by preliminary circulation therethrough of refrigerated textile spirits, the cooled solvent entering through the inlet 18 and leaving the apparatus through the outlet 19. The supply of solvent cooled to 40° F. and containing triphenyl phosphate crystals in suspension is then pumped into the filter press through the inlet 18 passing through the channels 16 and by-passes 20. The solid triphenyl phosphate crystals are filtered from the solvent by means of screen 21 and forms a solid cake in the frame 13. The solvent itself passes through the screen 21 through the by-pass 22 and thence through the channel 17 to the outlet 19. Filtering proceeds at a comparatively low pressure until the cake-forming space of the press is filled with the triphenyl phosphate crystals, whereupon the pressure rises rapidly until a dense cake is produced. A sudden rise in pressure to about 150 pounds per square inch as shown by the gauge 23 indicates that the cake-forming space is completely filled. The supply of slurry is then discontinued, the press unlocked and the plates and frames separated so as to provide a free space of approximately 2 inches between each plate and frame. The telescoping portion of the hood 6 is then lowered, the removable panels 2 are placed around the lower part of the press and the blower 12 is started causing a draft of cool air to pass through the press between the plates and frames. In order to prevent too rapid vaporization of the textile spirits with possible formation of an explosive mixture, it is desirable to pass this cool air through the press for a period of about 5 hours. At the end of this time the temperature of the air may be raised to about 100 to 110° F. by means of heaters 10 and the draft of warm air continued for about 11 hours more, or until the triphenyl phosphate cake is thoroughly dry.

After the filter cake has been completely dried, the counter-weighted portion 6 may be raised, the panels 2 removed from the lower part of the press, and the dry solid cake of triphenyl phosphate broken out of the press and discharged into a pan 24 temporarily placed thereunder.

Fig. 2 is an elevational view partially in section taken on the line 2—2 of Fig. 1 showing one of the frames 13 in place in the press after the filtering operation has been completed and containing the impacted dry mass of filter cake 25 ready for removal.

The usual prior art method of drying out the filter cake is to remove it from the press in damp condition and place it in shallow trays in a drying cabinet. This is a hazardous and inconvenient procedure, especially when handling materials as in the present case, which contain a considerable amount of liquid of an inflammable or explosive character. The above described means and method for drying out the filter cake not only obviates the usual explosion or fire hazards, but also eliminates the necessity for handling the material numerous times as is the case when using drying-cabinets.

Example II

A cellulose acetate plastic insoluble in methyl alcohol and containing cellulose nitrate in addition to the cellulose ester material and plasticized with ortho-cresyl para-toluene sulfonate is leached with methyl alcohol using the counter-current principle. A solution is obtained containing 20 grams of ortho-cresyl para-toluene sulfonate and 2 grams of nitrocellulose per 100 grams of methyl alcohol. One hundred grams of the solution is warmed to 80° F. and 50 grams of water are added. The addition of water precipitates the ortho-cresyl para-toluene sulfonate and, unavoidably, a portion of the nitrocellulose. The mixture is cooled to 50° F. and filtered off. The filtrate after evaporation yields a residue of 2 grams of resinous solid which is principally nitrocellulose contaminated with a small amount of plasticizer. This may be discarded as the amount of plasticizer entrained therein is negligible, or the material may be dissolved in appropriate solvents and reused as a nitrocellulose dope.

The crude precipitate obtained above by the addition of water to the alcoholic solution is added to about 70 grams of "Textile spirits" at 100° F. and the mixture agitated. The plasticizer dissolves, leaving a flocculent precipitate of nitrocellulose which is filtered out. The clear filtrate is cooled to 50° F. whereupon the plasticizer crystallizes out. The solid material is filtered from the hydrocarbon liquor, filter pressed, and air dried. A yield of 10.5 grams of pure ortho-cresyl para-toluene sulfonate is obtained. It is found that about 2.2 grams of the plasticizer are soluble in the saturated solution of "Textile spirits" at 50° F., and therefore remain therein. As in the previous example, this saturated solution may be re-used to dissolve a further bath of crude plasticizer at 100° F. and the process repeated.

Example III

A leaching solvent after counter-current leaching of a batch of a cellulose acetate nitrocellulose plastic contains 30 grams of monochlornaphthalene and 2 grams of nitrocellulose in 100 grams of alcohol. Addition of 50 grams of water precipitates the bulk of the nitrocellulose, while the liquid monochlornaphthalene which is substantially insoluble in water, separates into a well-defined layer. The mixture cannot be satisfactorily filtered and the monochlornaphthalene and nitrocellulose are separated from the alcohol and water by means of a centrifuge.

"Textile spirits" is then added to the nitrocellulose and monochlornaphthalene. The monochlornaphthalene dissolves readily in the naphtha while the nitrocellulose, which is entirely insoluble and precipitates, is removed by filtration. The solution of monochlornaphthalene in "Textile spirits" is then separated by fractional distillation, leaving a residue of pure monochlornaphthalene.

Example IV

A leaching solvent after counter-current leaching of a cellulose ester plastic contains 30 grams of butyl sulfone and 2 grams of nitrocellulose dissolved in 100 grams of methyl alcohol. The alcohol is removed by distillation, leaving the residue of butyl sulfone contaminated with nitrocellulose. Textile spirits is added to this residue at a temperature of 100° F., with the result that the plasticizer is completely dissolved, while the insoluble nitrocellulose is precipitated and filtered off. The filtrate is cooled to 50° F. and the butyl sulfone is crystallized therefrom and separated by filtration or equivalent means.

The mother liquor from which these crystals are separated contains an amount of plasticizer representing saturation at 50° F. It will thus be evident that in first starting the process the yields of plasticizer obtained will be low until the concentration of the plasticizer in the hydrocarbon solvent is built up to an amount representing saturation at 50° F.

EXAMPLE V

A leaching solvent obtained as in the previous example by the treatment of a cellulose ester material contains 30 grams of ethyl acetanilide and 2 grams of nitrocellulose dissolved in 100 grams of methyl alcohol. The alcohol is evaporated until a solid residue is obtained, which is dissolved in 80 grams of "Textile spirits" at 100° F. All of the material does not dissolve and a gummy residue is left suspended in the solution which consists essentially of nitrocellulose. This residue is filtered off and the filtrate cooled to 50° F. Ethyl acetanilide crystallizes out from the solution in pure form and is filtered off and thoroughly air-dried.

Ethyl acetanilide in an amount representing saturation at 50° F. remains in the "Textile spirits" filtrate which is re-used in a subsequent treatment of the residue produced by evaporating the first alcoholic solution.

EXAMPLE VI

A cellulose ester plastic plasticized with ethyl benzoate and containing nitrocellulose as an impurity is leached with methyl alcohol. 100 grams of the alcohol leaching solution after separation of the undissolved cellulose ester contains 30 grams of ethyl benzoate and 2 grams of nitrocellulose. The alcohol is removed from the solution by distillation, there being left behind in the still an emulsion of ethyl benzoate and water. The water present in this residue is that which was present in the cellulose ester material originally leached. It should be noted that it is customary to reduce the cellulose ester film scrap or similar material to a relatively finely divided condition, subject it to bleaching or other treatment, followed by washing, and it generally consists of a mass of wet bits or portions containing an appreciable amount of water as indicated in Example I.

A low boiling paraffin hydrocarbon is added to this emulsion and the mixture agitated. The hydrocarbon, being immiscible with and lighter than water, separates, forming a supernatant layer in which all of the ethyl benzoate is dissolved. The nitrocellulose being insoluble in both hydrocarbon and water precipitates and is removed by filtration. The hydrocarbon layer is separated by decantation or centrifuging. Pure ethyl benzoate is obtained from this hydrocarbon solution by distillation. The temperature is kept below 92° C. at about 20 mm. pressure in order that the ethyl benzoate shall not be carried over into the distillate and thereby lost.

EXAMPLE VII

A leaching solvent after the treatment of a given cellulose ester scrap contains 30 grams of tricresyl phosphate and 2 grams of nitrocellulose in 100 grams of methyl alcohol. The alcohol and whatever water is present are distilled off and a viscous solution of nitrocellulose in tricresyl phosphate remains. A low boiling hydrocarbon is added to this solution, dissolving out the tricresyl phosphate and precipitating the nitrocellulose. The latter is filtered from the solution and pure tricresyl phosphate obtained by distilling off the hydrocarbon solvent.

EXAMPLE VIII

A leaching solvent after the treatment of a cellulose acetate-nitrocellulose plastic contains 30 grams of diethyl phthalate and 2 grams of nitrocellulose dissolved in 100 grams of methyl alcohol. 50 grams of water is added precipitating a substantial proportion of nitrocellulose which is filtered off. The alcohol and water are removed from the filtrate by distillation, leaving behind a solution comprising the remainder of the nitrocellulose dissolved in diethyl phthalate. Textile spirits is added to this viscous solution, dissolving the diethyl phthalate and precipitating the nitrocellulose. The nitrocellulose is removed by filtration and the pure di-ethyl phthalatae is recovered by distilling off the Textile spirits.

In the above examples I have presented a general discussion of my improved process of recovering plasticizers from cellulose material. I have found that with proper control of the various phases of the process excellent yields of plasticizer may be obtained, these yields running anywhere from about 50% to in excess of 98%, based upon the weight of the plasticizer originally present in the plastic material.

While I have illustrated several of the preferred embodiments of my invention, it will be understood that many changes in materials and conditions of operation may be made within the scope of my invention as applied to the treatment of photographic film and other plastic materials. For example, I may use various solvent mixtures in my original leaching operations, the particular solvent used depending on the composition of the plastic material and upon the particular plasticizer used therein. As applied to cellulose acetate plastics or to film the support of which is cellulose acetate, I may use methyl or ethyl alcohol or combinations of these alcohols with other solvent materials, such as acetone. In general, it may be said that the leaching solvent should be of sufficient solvent power to dissolve out all of the plasticizer, while leaving the cellulose acetate support unaffected. The support may and should be preferably softened by the leaching solvent but the softening should not go to the point of actual solution. It should also be noted that the process described herein is equally applicable to batch, or continuous operation. Generally speaking, continuous operation is more economical of time and materials and is therefore preferred.

As indicated by the foregoing examples, the invention is not limited to the treatment of film scrap. In its broader aspects it includes the treatment of any type of cellulose ester plastic, such as sheets, films, molded material, and the like. I have found that where a plastic material, such as nitrocellulose, is not to be used again in conjunction with photographic emulsions for the production of film, it may be leached directly with the low boiling hydrocarbon solvent heated to the proper temperature and the plasticizer directly crystallized out by appropriately lowering the temperature of the solvent. It is, of course, necessary to continue the leaching of the scrap material with the heated solvent until the concentration of plasticizer in the leaching solution is built up to a point at which a strong solution is produced upon cooling and from which effective separation of the plasticizer can be accomplished. In some cases it is desirable to reduce the plastic material to a fine state of subdivision by cutting it up into small pieces or grinding in order to facilitate the action of the solvent.

When applying the process to the recovery of plasticizers from cellulose acetate plastic material, for example, the material is leached with a solvent such as alcohol or mixtures of alcohol with acetone, benzol or other solvents and diluents. As in the case of treating film scrap as described above, the solvent should dissolve out the plasticizer, but should leave the cellulose ester substantially unaffected. Preferably the solvent should have a softening action on the plastic as this facilitates leaching out the plasticizer. In any given case the leaching solvent must be chosen with reference to the particular plastic material dealt with. After the leaching operation, the plasticizer may then be directly separated from solution, uncontaminated by cellulose ester, or other impurities by the addition of water, or other appropriate precipitant or non-solvent thereto, and is separated by filtration or equivalent means. It will be evident that I am here referring to a simple plastic material, such as cellulose acetate plasticized with triphenyl phosphate, for example, and in which there is no subcoating or admixture of nitrocellulose. When the latter is present, it is, of course, necessary to use the special technique described in the specific example given above.

From the foregoing it will be seen that my invention is broadly applicable to any type of cellulose ester plastic, and is not restricted to the recovery of crystalline or solid plasticizers, but applicable to the liquid plasticizers as well. It therefore provides a means whereby all of the usual types of liquid and solid plasticizing materials may be reclaimed and reused in further plastic manufacture.

While my invention has been described as applied to cellulose acetate plastics or cellulose acetate and cellulose nitrate, it is also applicable to plastics produced from the higher single or mixed esters of cellulose, such as cellulose propionate, cellulose stearate, cellulose acetate-propionate, cellulose acetate-stearate, and others. Furthermore, it is applicable to certain of the inorganic esters of cellulose, particularly cellulose nitrate.

In the case of low boiling paraffin hydrocarbon leaching solvents a petroleum fraction having an approximate boiling range of 70–105° C. is preferred although I am not in any way limited thereto. Other paraffin hydrocarbon liquids, however, having somewhat greater boiling ranges may be employed. The particular solvent selected is governed largely by the degree of purity desired in the plasticizer. If it is to be used again in the manufacture of photographic films, it is necessary to use a relatively volatile low-boiling hydrocarbon in order that all traces of the solvent can be removed from the plasticizer by filter-pressing and air-drying, since the presence of even minute amounts of hydrocarbon materials has a deleterious effect on the sensitive photographic emulsions subsequently applied to the film support in which the plasticizer is reused. The same necessity for using a volatile material which may be completely removed is present if the leached scrap itself is to be reused in the manufacture of film support. A hydrocarbon liquid of almost any low degree of volatility may be used, the limitations imposed being governed by the difficulty encountered in handling such material, its tendency to form explosive mixtures with air, and the losses resulting from too ready evaporation.

While I have described my invention with particular reference to triphenyl phosphate, it may be successfully applied to the recovery of many other solid and liquid plasticizers as typified by ortho-cresyl para-toluene sulphonate, butyl sulphone, ethyl acetanilide, monochlor-naphthalene, ethyl benzoate, tri-cresyl phosphate and diethyl phthalate for which examples have been given.

My invention is particularly characterized by the leaching out of the plasticizer and formation of a solution thereof from which the plasticizer may be obtained by precipitation or fractional distillation, uncontaminated by the presence of cellulose ester material. In the case of cellulose acetate film scrap it is distinguished by the use of a leaching solvent which leaves the cellulose acetate support unaffected and also by the provision of a refining treatment for the crude plasticizer thus obtained which involves the use of a solvent which not only completely dissolves the plasticizer, but is also wholly a non-solvent with respect to any contaminating cellulose ester material which may be present, thus permitting the plasticizer to be obtained in substantially 100% purity.

What I claim as my invention and desire to be secured by Letters Patent of the United States is:

1. The process of recovering triphenyl phosphate from a mixture comprising nitro-cellulose and triphenyl phosphate, which comprises leaching out the triphenyl phosphate with a hot, low-boiling paraffin hydro-carbon nitrocellulose non-solvent to form a super-saturated solution, separating the undissolved nitrocellulose and thereafter crystallizing out the triphenyl phosphate by reducing the temperature of the solution.

2. The process of recovering a plasticizer from a cellulose acetate plastic containing it which comprises leaching out the plasticizer with a cellulose acetate non-solvent, separating the undissolved cellulose acetate, and separating the plasticizer from the solution by adding a plasticizer non-solvent thereto.

3. The process of recovering triphenyl phosphate from a cellulose acetate plastic containing it, which comprises leaching out the triphenyl phosphate with a cellulose acetate non-solvent, separating the undissolved cellulose acetate, and precipitating out the triphenyl phosphate from the solution by adding a non-solvent thereto.

4. The process of recovering triphenyl phosphate from a cellulose acetate plastic containing it, which comprises leaching out the triphenyl phosphate with methyl alcohol, separating the undissolved cellulose acetate, and precipitating out the triphenyl phosphate by adding water to the leaching solution.

5. The process of recovering a plasticizer from cellulose organic ester plastic material containing nitro-cellulose which comprises simultaneously leaching out the plasticizer and dissolving the nitrocellulose with a common solvent therefor, precipitating and separating nitrocellulose from the plasticizer-nitrocellulose solution by adding a nitrocellulose non-solvent thereto, and thereafter separating out the plasticizer from the solution.

6. The process of recovering a plasticizer from cellulose organic ester plastic material containing nitrocellulose which comprises leaching out the plasticizer and nitrocellulose with a solvent which leaves the cellulose organic ester substantially undissolved, precipitating and separating nitrocellulose from the plasticizer in the leaching solution by adding water thereto, crystallizing out the plasticizer from the solution and subjecting it to a refining treatment.

7. The process of recovering triphenyl phosphate from film scrap comprising a cellulose organic ester support and a nitrocellulose overcoating which comprises dissolving out the triphenyl phosphate and nitrocellulose with a solvent which has no appreciable solvent action on the material of the support, precipitating the major portion of the nitrocellulose from the solution by adding water, crystallizing out of the solution a crude triphenyl phosphate contaminated with nitrocellulose, dissolving out the triphenyl phosphate from the crude with a paraffin hydrocarbon nitrocellulose non-solvent, removing the undissolved nitrocellulose from the resulting solution, and crystallizing from the hydrocarbon solution pure triphenyl phosphate.

8. The process of recovering triphenyl phosphate from a film scrap comprising a cellulose acetate support and nitrocellulose overcoating, which comprises dissolving out the triphenyl phosphate and nitrocellulose with alcohol, separating the undissolved cellulose acetate from the solution, adding water in sufficient amount to precipitate the major portion of the nitrocellulose, separating the precipitated nitrocellulose from the solution, precipitating out a crude triphenyl phosphate slightly contaminated with nitrocellulose, redissolving the triphenyl phosphate from the crude with a low-boiling hydrocarbon nitrocellulose non-solvent, separating precipitated nitrocellulose from the hydrocarbon solution and crystallizing therefrom pure triphenyl phosphate.

9. The process of recovering monochlornaphthalene from a cellulose organic ester plastic comprising nitrocellulose which comprises leaching out the plasticizer and nitrocellulose with a solvent which leaves the cellulose organic ester substantially undissolved, precipitating and separating, the bulk of the nitrocellulose from the solution by adding a nitrocellulose non-solvent thereto, treating the monochlornaphthalene contaminated with nitrocellulose, by adding thereto a hydrocarbon nitrocellulose non-solvent thereto, mechanically separating the undissolved nitrocellulose and separating the monochlornaphthalene from solution by distillation.

10. The process of refining a crude plasticizer contaminated with cellulose ester material which comprises dissolving the plasticizer in a low boiling paraffin hydrocarbon non-solvent for the cellulose ester, removing the undissolved ester material, and separating out the pure plasticizer from the solution.

11. The process of refining crude triphenyl phosphate contaminated with cellulose ester material which comprises dissolving the triphenyl phosphate with a paraffin, hydrocarbon non-solvent for the cellulose ester having a boiling range of approximately 70–105° C. separating the undissolved cellulose ester from the solution, and crystallizing the triphenyl phosphate therefrom.

12. The process of refining crude triphenyl phosphate contaminated with nitrocellulose which comprises dissolving the triphenyl phosphate with "Textile Spirits", separating the undissolved nitrocellulose from the solution and crystallizing triphenyl phosphate therefrom.

13. The process of refining crude triphenyl phosphate contaminated with nitrocellulose which comprises dissolving the triphenyl phosphate with hot "Textile Spirits", separating the undissolved nitrocellulose from the solution, and thereafter cooling and crystallizing triphenyl phosphate therefrom.

14. The process of recovering triphenyl phosphate from a cellulose ester material comprising the same which comprises leaching the material with hot "Textile Spirits", cooling the resulting solution and crystallizing pure triphenyl phosphate therefrom.

15. The process of recovering triphenyl phosphate from a cellulose ester material comprising the same which comprises leaching the material with hot "Textile Spirits", cooling the resulting solution, crystallizing pure triphenyl phosphate therefrom and reusing the hydrocarbon mother liquor for the leaching of further plasticizer containing material.

MARVIN JEROME REID.